(12) United States Patent
Yang

(10) Patent No.: US 8,155,157 B2
(45) Date of Patent: Apr. 10, 2012

(54) METHOD AND APPARATUS FOR SYNCHRONIZING APPLICATIONS OF TERMINALS IN COMMUNICATION NETWORK

(75) Inventor: Chil-youl Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 896 days.

(21) Appl. No.: 11/730,119

(22) Filed: Mar. 29, 2007

(65) Prior Publication Data

US 2008/0075126 A1 Mar. 27, 2008

(30) Foreign Application Priority Data

Sep. 22, 2006 (KR) .......... 10-2006-0092458
Oct. 20, 2006 (KR) .......... 10-2006-0102482

(51) Int. Cl.
*H04J 3/06* (2006.01)
(52) U.S. Cl. ..................................... 370/503
(58) Field of Classification Search .............. 370/469, 370/503–520
See application file for complete search history.

(56) References Cited

U.S. PATENT DOCUMENTS

| | | | | |
|---|---|---|---|---|
| 6,735,198 B1* | 5/2004 | Edsall et al. | ................ | 370/389 |
| 2002/0159401 A1* | 10/2002 | Boger | ................ | 370/294 |
| 2003/0115369 A1* | 6/2003 | Walter et al. | ................ | 709/253 |
| 2003/0169774 A1* | 9/2003 | Del Prado Pavon et al. | . | 370/503 |
| 2004/0220726 A1* | 11/2004 | Jin et al. | ................ | 701/207 |
| 2005/0013267 A1* | 1/2005 | An | ................ | 370/328 |
| 2005/0152330 A1* | 7/2005 | Stephens et al. | ................ | 370/350 |
| 2005/0180385 A1* | 8/2005 | Jeong et al. | ................ | 370/350 |
| 2005/0201340 A1* | 9/2005 | Wang et al. | ................ | 370/337 |
| 2005/0259754 A1 | 11/2005 | Ho et al. | | |
| 2006/0067280 A1* | 3/2006 | Howard et al. | ................ | 370/337 |
| 2006/0126671 A1* | 6/2006 | Park et al. | ................ | 370/503 |
| 2006/0209769 A1 | 9/2006 | Akamatsu et al. | | |

FOREIGN PATENT DOCUMENTS

| | | |
|---|---|---|
| EP | 1499086 A2 | 1/2005 |
| WO | WO 01/17166 A2 | 3/2001 |
| WO | WO 01/71981 A2 | 9/2001 |
| WO | WO 02/077860 A1 | 10/2002 |

OTHER PUBLICATIONS

Kusy, B., et al., "Elapsed time on arrival: a simple and versatile primitive for canonical time synchronisation services", International Journal of Ad Hoc and Ubiquitous Computing, Jul. 2006, pp. 239-251, vol. 1, No. 4, Inderscience Enterprises Ltd., XP 008116607.

Simon, G., et al., "Sensor Network-Based Countersniper System", Proceedings of the International Conference on Embedded Networked Sensor Systems, Nov. 3, 2004, pp. 1-12, vol. 2nd, XP 008116618.

(Continued)

*Primary Examiner* — Ricky Ngo
*Assistant Examiner* — Wei-Po Kao
(74) *Attorney, Agent, or Firm* — Sughrue Mion, PLLC

(57) ABSTRACT

A method and apparatus for synchronizing applications of network terminals are provided. Time information, which is synchronized and managed with other terminals for controlling use of media in the network in a media access control (MAC) layer, is transmitted to an application layer so as to directly execute the application using a synchronization interface. Accordingly, it is possible to synchronize applications without exchanging packets for obtaining synchronization information of terminals using a TCP/IP protocol.

15 Claims, 2 Drawing Sheets

OTHER PUBLICATIONS

Maroti, M., et al., "The Flooding Time Synchronization Protocol", Proceedings of the International Conference on Embedded Networked Sensor Systems, Nov. 3, 2004, pp. 39-49, vol. 2nd, XP 009106419.

Sundararaman, B., et al., "Clock Synchronization for wireless sensor networks: a survey", Ad Hoc Networks, May 1, 2005, pp. 281-323, vol. 3, No. 3, Elsevier B.V., XP 004848800.

Ganeriwal, S., et al., "Timing-sync Protocol for Sensor Networks", Proceedings of the 1st International Conference on Embedded Networked Sensor Systems, Nov. 3, 2003, pp. 1-12, vol. Conf. 1, XP 002459888.

Harada, S., et al., "Development of Audio and Video Synchronous Transmission System Based on IEEE802.11a", pp. 316-319, Consumer Communications and Networking Conference, Jan. 5-8, 2004.

Communication dated Jun. 15, 2011 from the European Patent Office in counterpart European Application No. 07793753.0.

Fan, B YC, "card.c", Koders.com., Sep. 1, 2003, XP000863974, Retrieved from the Internet: URL: http://www.koders.com/c/fid2F9BC1DBFC1F27D9CCF0E0EA059583172CE81F8B.aspx?s=crc [retrieved on Jun. 9, 2011], 26 pages.

Communication dated Apr. 13, 2011 from the State Intellectual Property Office of P.R. China in counterpart Chinese patent application No. 200780033504.1.

Communication dated Nov. 25, 2011 issued by the State Intellectual Property Office of P.R. China in counterpart Chinese Patent Application No. 200780033504.1.

* cited by examiner

Time Synchronization at MAC layer

METHOD AND APPARATUS FOR SYNCHRONIZING APPLICATIONS OF TERMINALS IN COMMUNICATION NETWORK

CROSS-REFERENCE TO RELATED PATENT APPLICATION

This application claims priority from Korean Patent Application No. 10-2006-0092458, filed on Sep. 22, 2006 in the Korean Intellectual Property Office, and Korean Patent Application No. 10-2006-0102482, filed on Oct. 20, 2006 in the Korean Intellectual Property Office, the disclosures of which are incorporated herein in their entirety by reference.

BACKGROUND OF THE INVENTION

1. Field of the Invention

Methods and apparatuses consistent with the present invention relate to time synchronization, and more particularly, to synchronizing applications of network terminals.

2. Description of the Related Art

Various types of data are transmitted through a communication network. In particular, when data such as audio/video (AV) Streaming is transmitted/received, time synchronization between a transmitter and a receiver is very important, and the transmitter and receiver attempt synchronization using various algorithms while exchanging packets including time information.

FIG. 1 is a conceptual diagram for explaining a related art method of synchronizing applications of network terminals.

As shown in FIG. 1, in the related art, a dedicated application or a functional module within an application is used for time synchronization between two or more terminals connected to a network. There are various methods used for time synchronization. For example, the application of a terminal on a transmitter-side generates and transmits packets including time information to a terminal on a receiver-side, and the receiver-side terminal receives the packet. In this case, receiver-side terminal calculates accurate time of the transmitter-side terminal based on a processing delay and a network propagation delay of the transmitter-side terminal and a processing delay of the receiver-side terminal, and then synchronizes the time with the transmitter-side terminal. Alternatively, the applications of the transmitter-side terminal transmit the packets including the time information to the receiver-side terminals. Then the receiver-side terminal receives the packets and sends the response packet to the transmitter-side terminal. By a repetition of the frame exchange process, accurate timing of the transmitter-side terminal and the receiver-side terminal is calculated based on the processing delay, network propagation delay or the like in order to synchronize with a reference time, so that time synchronization is completed.

In the related art, there are various methods of time synchronization. In all the methods, synchronization is performed in the applications having a time synchronization function. However, a network interface provides a path for synchronization or "processing delay" information, but it does not directly perform any process of synchronization.

In other words, in many cases, in order to synchronize terminals connected to a network with other terminals, a Transmission Control Protocol/Internet Protocol (TCP/IP) protocol stack and a synchronization dedicated application or a functional module for time synchronization in an application are required.

However, low price consumer electronics (CE) products that include such a function require a high-end system, resulting in an increase in price. Moreover, the network terminals should exchange additional packets as well as data packets in order to perform time synchronization, and therefore network traffic increases.

SUMMARY OF THE INVENTION

The present invention provides a method and apparatus for synchronizing applications based on information previously acquired in a media access control (MAC) layer without exchanging packets between network terminals.

According to an aspect of the present invention, there is provided a method of executing an application in a terminal connected to a network, comprising: an application layer requesting synchronization information from an MAC layer; the MAC layer providing time information synchronized and managed with other terminals of the network for controlling use of media in the network to the application layer in response to the request; and the application layer executing the application based on the time information.

The network may be a wireless local area network (WLAN), and the time information may be set based on a timestamp field of a beacon frame.

In addition, the network may be a wireless personal area network (WPAN), and the time information is set based on a piconet synchronization parameter field of a beacon frame.

In addition, in the providing of the time information, the MAC layer may provide the time information to the application layer using a service access point (SAP).

In addition, the MAC layer may provide a result of correction of the timestamp field according to characteristic of the terminal to the application layer. In addition, the MAC layer may provide a result of correction of the piconet synchronization parameter field according to characteristic of the terminal to the application layer. In addition, the application may further comprise the MAC layer providing information for correcting the time information according to characteristic of the terminal to the application layer.

According to another aspect of the present invention, there is provided a computer readable recording medium having recorded thereon a program for executing the method of executing an application in a terminal connected to a network.

According to another aspect of the present invention, there is provided an application executing apparatus in a terminal connected to a network using an MAC layer module and executing an application using an application layer module, wherein the application layer module requests synchronization information from the MAC layer module and executes the application based on the synchronization information in response to the request, and wherein the MAC layer module provides time information, which is synchronized and managed with other terminals for controlling use of media in the network, to the application layer in response to the request.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY
EMBODIMENTS OF THE INVENTION

Hereinafter, the exemplary embodiments of the present invention will be described in detail with reference to the attached drawings.

Figure 1:
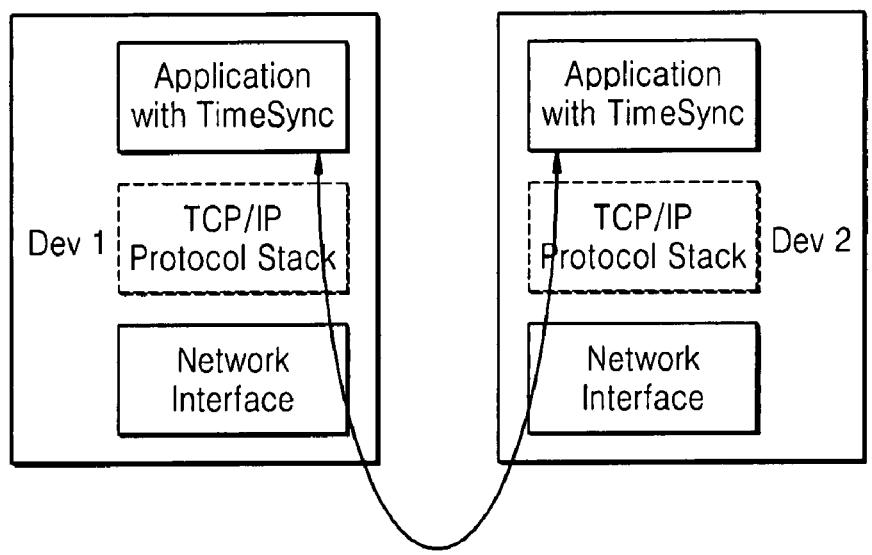
FIG. 1 is a conceptual diagram for explaining a related art method of synchronizing applications of network terminals.
Figure 2:
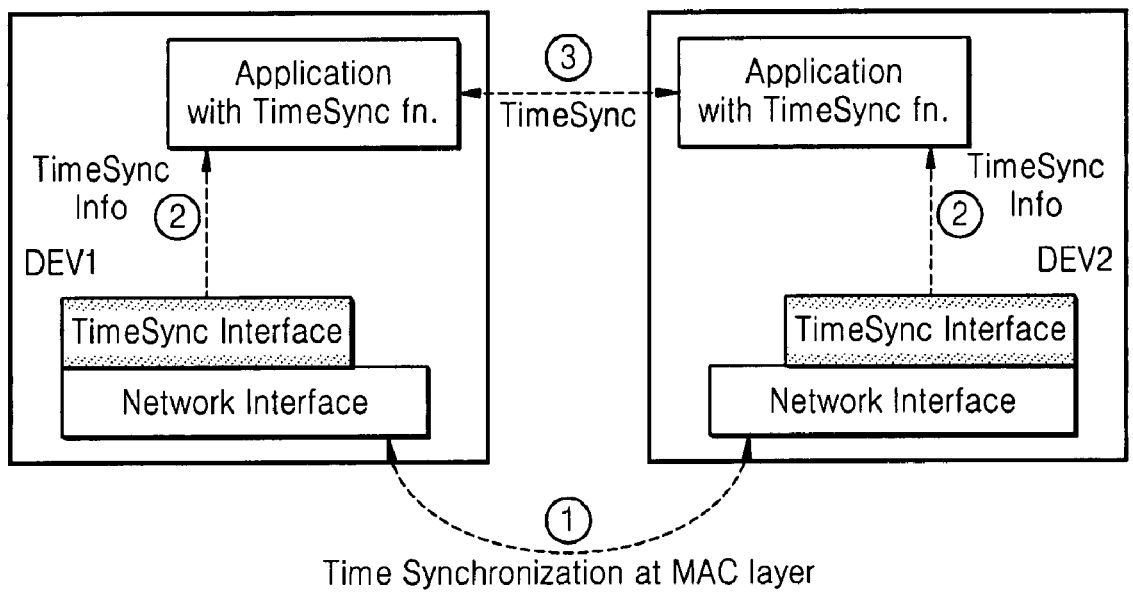
FIG. 2 is a conceptual diagram for explaining a method of synchronizing applications of network terminals according to an exemplary embodiment of the present invention.

FIG. 2 is a conceptual diagram for explaining a method of synchronizing applications of network terminals according to an exemplary embodiment of the present invention As shown in FIG. 2, terminals DEV1 AND DEV2 connected to the network perform time synchronization by using a network interface. The network interface may be a module which functions as an MAC layer. When a plurality of terminals connected to the network use media, a mechanism for granting an equal authority to access medium to the terminals requires time synchronization. Therefore, the network terminals of the present invention provide a time synchronization function in the MAC layer ①.

For example, the network in accordance with such standards as IEEE 802.11 and IEEE 802.15.3 is provided with the time synchronization function. The terminals perform time synchronization with reference to a timestamp field of a beacon frame in a WLAN in accordance with the IEEE 802.11 standard. On the other hand, the terminals perform time synchronization with reference to a piconet synchronization parameter field of a beacon frame in a WPAN.

Since the terminals connected to the network have already performed time synchronization in the MAC layer, and the terminals can perform time synchronization of applications using time information of the MAC layer without exchanging packets by using a TCP/IP protocol stack. The network interface of the network terminals according to an exemplary embodiment of the present invention, that is, the MAC layer, includes a time synchronization interface for directly transmitting the time information to the application layer without passing through any other layer. In other words, the application layer may acquire the time information by using the time synchronization interface ② and perform the time synchronization with applications of other terminals connected to the network using the time information ③.

The time synchronization interface may be implemented with an MAC service access point (SAP). The application may call a specific function provided by the MAC layer of the network terminal to acquire the time information.

The MAC layer may provide correction information used for correcting the time information in addition to the time information. When the time information managed by the MAC layer is delayed in its arrival at the application due to a processing delay, accurate synchronization may not be accomplished. Therefore, the MAC layer may provide the correction information to the application layer according to a characteristic of a system. Alternatively, a separate function for acquiring the correction information may be provided in the form of the MAC SAP.

Figure 3:
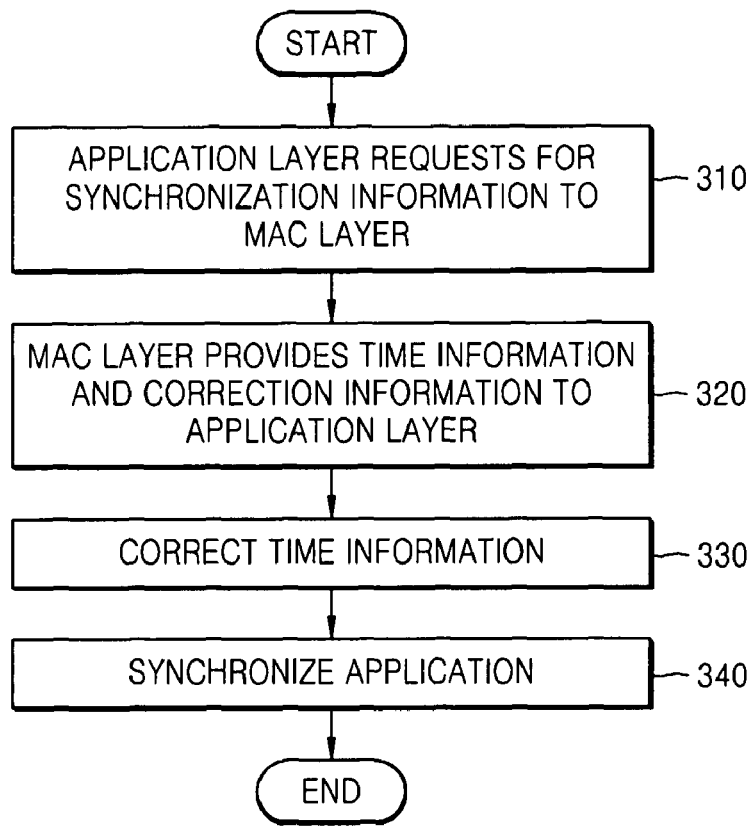
FIG. 3 is a flowchart of a process for synchronizing applications of networks terminals according to an exemplary embodiment of the present invention.

FIG. 3 is a flowchart of a process for synchronizing applications of networks terminals according to an exemplary embodiment of the present invention; and In operation 310, the application layer requests synchronization information used for synchronizing the application to the MAC layer. As described above, in operation 310, the application layer may call the function offered by the MAC SAP.

In operation 320, the MAC layer provides to the application layer, the time information managed by the terminals, which are connected to the network, for the purpose of medium access control of the network. The network terminals acquire such time information based on a timestamp field of a beacon frame in a WLAN and based on a piconet synchronization parameter field of a beacon frame in a WPAN.

As described above, when the MAC layer provides the time information, the correction information may be simultaneously provided according to characteristic of the terminal. Depending on the exemplary embodiments, the MAC layer may correct the time information according to characteristic of the terminal, and then provide the result to the application layer.

In operation 330, the application layer acquires the time information and the correction information and then corrects the time information using the correction information.

In operation 340, the application layer executes the application by applying the corrected time information. In such a process, the application connected to the network can be synchronized with the applications of other terminals. For example, when the application performs a function of generating transport stream packets for transmitting video data, the time information of medial access control layer can be used to set the timestamp field of the transport stream packets, and then the receiver-side terminals can reproduce the video data seamlessly.

Figure 4:
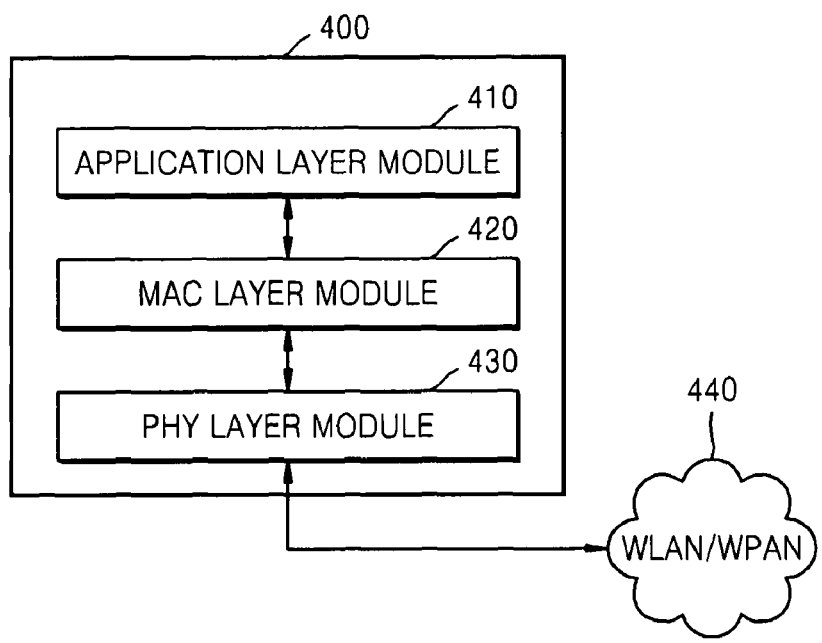
FIG. 4 is a diagram showing a structure of network terminals for processing applications according to an exemplary embodiment of the present invention.

FIG. 4 is a diagram showing a structure of a network terminal for processing an application according to an exemplary embodiment of the present invention.

As shown in FIG. 4, the network terminal 400 according to the present exemplary embodiment includes an application layer module 410, an MAC layer module 420 and a physical layer module 430.

The application layer module 410 requests the MAC layer module 420 to provide synchronization information and performs synchronization of the application based on the information received in response to the request.

When the request for the synchronization information is received, the MAC layer module 420 provides the time information, which is synchronized and managed with other terminals for controlling the use of medium in the network, to the application layer module 410 in response to the request.

As described above, the MAC layer module 420 may provide the correction information together with the time information. Alternatively, the MAC layer module 420 may provide the time information to the application layer after independently correcting the time information The time information is transmitted using a beacon frame or the like in a network such as a WLAN or WPAN. The physical layer module 430 receives the beacon frame and transmits the beacon frame to the MAC layer 420.

Alternatively, the above described exemplary embodiments of the invention may be implemented using a computer programs which are executed in a general purpose digital computer using a computer readable recording medium.

The computer readable recording medium a includes storage medium such as a magnetic storage (for example, ROM, floppy disk, hard disk, or the like), or an optical readable medium (for example, CD-ROM, DVD or the like).

According to the exemplary embodiments of the present invention, synchronization of an application can be accomplished by providing time information, which is basically managed by a network interface layer of terminals, to an upper layer without using a separate functional module for time synchronization. In addition, a separate process for exchanging packets for time synchronization is not required, so that network traffic is reduced.

Therefore, the network does not require a TCP/IP protocol stack or an application for time synchronization, and it is possible to shorten the time required for product development and reduce the cost.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of executing an application in a terminal connected to a network, the method comprising:
    requesting synchronization information from a media access control (MAC) layer, by an application layer;
    providing time information which is managed for medium access control in the network from the MAC layer to the application layer in response to the requesting;
    synchronizing, based on the time information, the application in the terminal with another application on a second terminal connected to the network, the application and the other application being synchronized without exchanging packets between the terminal and the second terminal; and
    executing the application by the application layer based on the time information,
    wherein the network is a wireless local area network, and the time information is set based on a timestamp field value of a beacon frame,
    wherein the providing the time information comprises the MAC layer directly transmitting the time information to the application layer via a time synchronization interface without passing through any other layer.

2. The method of claim 1, wherein in the providing of the time information, the MAC layer provides the time information to the application layer using a service access point.

3. The method of claim 1, wherein the MAC layer provides a result of correction of the timestamp field value according to a characteristic of the terminal to the application layer.

4. The method of claim 1, wherein the application generates transport stream packets for transmitting video data, and in the executing of the application, a timestamp field of the transport stream packets is set based on the time information.

5. The method of claim 1, further comprising providing information for correcting the time information according to a characteristic of the terminal from the MAC layer to the application layer.

6. A method of executing an application in a terminal connected to a network, the method comprising:
    requesting synchronization information from a media access control (MAC) layer, by an application layer;
    providing time information which is managed for medium access control in the network from the MAC layer to the application layer in response to the requesting;
    synchronizing, based on the time information, the application in the terminal with another application on a second terminal connected to the network, the application and the other application being synchronized without exchanging packets between the terminal and the second terminal; and
    executing the application by the application layer based on the time information, wherein the network is a wireless personal area network, and the time information is set based on a piconet synchronization parameter field value of a beacon frame,
    wherein the providing the time information comprises the MAC layer directly transmitting the time information to the application layer via a time synchronization interface without passing through any other layer.

7. The method of claim 6, wherein the MAC layer provides a result of correction of the piconet synchronization parameter field value according to a characteristic of the terminal to the application layer.

8. A non-transitory computer readable recording medium having recorded thereon a program for executing a method of executing an application in a terminal connected to a network, the method comprising:
    requesting synchronization information from a media access control (MAC) layer, by an application layer;
    providing time information which is managed for medium access control in the network from the MAC layer to the application layer in response to the requesting;
    synchronizing, based on the time information, the application in the terminal with another application on a second terminal connected to the network, the application and the other application being synchronized without exchanging packets between the terminal and the second terminal; and
    executing the application by the application layer based on the time information,
    wherein the network is a wireless local area network, and the time information is set based on a timestamp field value of a beacon frame,
    wherein the providing the time information comprises the MAC layer directly transmitting the time information to the application layer via a time synchronization interface without passing through any other layer.

9. An application executing apparatus in a terminal connected to a network; the application executing apparatus comprising:
    a media access control (MAC) layer module; and
    an application layer module which executes an application,
    wherein the application layer module requests the MAC layer module to provide synchronization information, and the MAC layer module provides time information, which is managed for medium access control in the network, to the application layer in response to the request, and executes the application based on time information received in response to the request,
    wherein the application layer module synchronizes, based on the time information, the application in the terminal with another application on a second terminal connected to the network, the application and the other application being synchronized without exchanging packets between the terminal and the second terminal, and
    wherein the network is a wireless local area network, and the time information is set based on a timestamp field value of a beacon frame,
    wherein the MAC layer module provides the time information by directly transmitting the time information to the application layer module via a time synchronization interface without passing through any other layer.

10. The application executing apparatus of claim 9, wherein the MAC layer module provides the time information to the application layer module via a service access point.

11. The application executing apparatus of claim 9, wherein the MAC layer module provides a result of correction of the timestamp field value according to a characteristic of the terminal to the application layer module.

12. The application executing apparatus of claim 9, wherein the application generates transport stream packets for transmitting video data, and the application layer module sets a timestamp field of the transport stream packets based on the time information.

13. The application executing apparatus of claim 9, wherein the MAC layer module provides information for correcting the time information according to a characteristic of the terminal to the application layer module.

14. An application executing apparatus in a terminal connected to a network; the application executing apparatus comprising:

a media access control (MAC) layer module; and
an application layer module which executes an application,
wherein the application layer module requests the MAC layer module to provide synchronization information, and the MAC layer module provides time information, which is managed for medium access control in the network, to the application layer in response to the request, and executes the application based on time information received in response to the request, wherein the application layer module synchronizes, based on the time information, the application in the terminal with another application on a second terminal connected to the network, the application and the other application being synchronized without exchanging packets between the terminal and the second terminal, and wherein the network is a wireless personal area network, and the time information is set based on a piconet synchronization parameter field value of a beacon frame, wherein the MAC layer module provides the time information by directly transmitting the time information to the application layer module via a time synchronization interface without passing through any other layer.

15. The application executing apparatus of claim 14, wherein the MAC layer module provides a result of correction of the piconet synchronization parameter field value according to a characteristic of the terminal to the application layer module.

* * * * *